United States Patent Office 2,706,732
Patented Apr. 19, 1955

2,706,732

HYDRAZINE DERIVATIVES

Robert Duschinsky, Essex Fells, and Morton Schmall, Nutley, N. J., assignors to Hoffmann-La Roche Inc., Roche Park, Nutley, N. J., a corporation of New Jersey No Drawing. Application October 21, 1953, Serial No. 387,518

6 Claims. (Cl. 260—343.6)

This invention relates to novel chemical compounds and to novel intermediates and novel processes useful in preparing said compounds. More particularly, it relates to the compounds formic acid 4-methoxy-2-nitrophenylhydrazide and oxalic acid mono 4-methoxy-2-nitrophenylhydrazide, which compounds can be represented by the generic formula

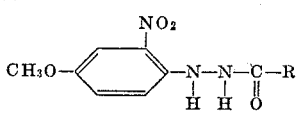

wherein R represents a hydrogen or a carboxyl radical. The two compounds represented by the above type formula are useful as chemotherapeutic materials, for instance, they can be used in combatting viral infections. The invention relates further to novel processes of making the compounds of the above formula. The invention also includes the novel class of compounds designated 4-methoxy-2-nitrophenylhydrazide of the α-oxalate of α,β,γ-trihydroxybutyric acid lactone, which can be used as intermediates to make oxalic acid mono 4-methoxy-2-nitrophenylhydrazide.

One process of making the compounds of the above type formula comprises reacting 4-methoxy-2-nitrophenylhydrazine with an acid selected from the class consisting of formic acid and oxalic acid.

An alternative process for making the compound oxalic acid mono- 4-methoxy-2-nitrophenylhydrazide comprises reacting a compound selected from the group consisting of ascorbic and araboascorbic acids (e. g. L-ascorbic acid or D-isoascorbic acid) with diazotized 4-methoxy-2-nitroaniline in acid solution to form the 4-methoxy-2-nitrophenylhydrazide of the α-oxalate of α,β,γ-trihydroxybutyric acid lactone (e. g. 4-methoxy-2-nitrophenylhydrazide of the α-oxalate of L-threonic acid lactone or 4-methoxy-2-nitrophenylhydrazide of D-erythronic acid lactone), treating the lactone intermediate with an alkali metal hydroxide to form an alkali metal salt of oxalic acid mono 4-methoxy-2-nitrophenylhydrazide and acidifying said salt. The formation of the intermediates and the final product in this process embodiment of the invention can be represented diagrammatically as shown below, but it should be understood that the invention is not limited by any theory as to the mechanism of the reaction.

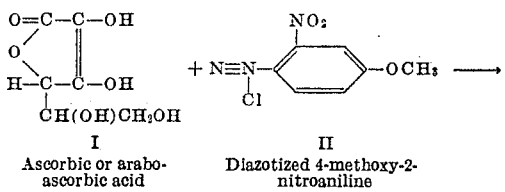

I
Ascorbic or araboascorbic acid

II
Diazotized 4-methoxy-2-nitroaniline

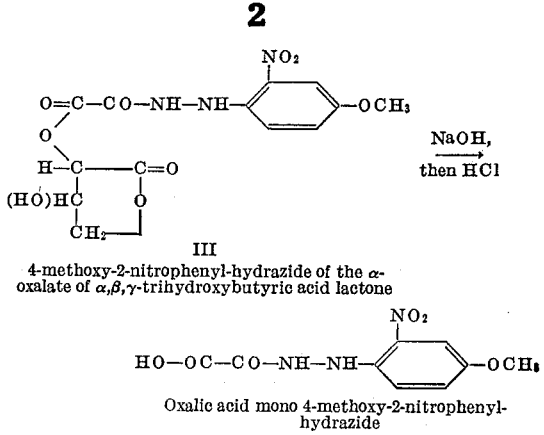

III
4-methoxy-2-nitrophenyl-hydrazide of the α-oxalate of α,β,γ-trihydroxybutyric acid lactone Oxalic acid mono 4-methoxy-2-nitrophenylhydrazide An alternative process for making the compound formic acid 4-methoxy-2-nitrophenylhydrazide comprises oxalic acid mono 4-methoxy-2-nitrophenylhydrazide, dissolved in a liquid aliphatic monocarboxylic acid, e. g. a lower alkanoic acid, at a temperature above about 115° C., for a time sufficient to effect decarboxylation of the starting material.

The invention is further disclosed in the following examples, which are illustrative but not limitative thereof.

Example 1

A suspension of 16.8 g. (0.1 mol) of 2-nitro-4-methoxyaniline in a mixture of 25 ml. of concentrated hydrochloric acid and 10 ml. of water was digested on the steam bath with stirring for about 15 minutes. After cooling and addition of about 30 g. of crushed ice, a solution of 7 g. (0.1 mol) of sodium nitrite in 20 ml. of water was added dropwise, keeping the temperature at 0° to 4° C. until potassium iodide-starch paper was slightly positive. The diazonium chloride solution was filtered and added dropwise to a solution of 17.6 g. (0.1 mol) of L-ascorbic acid in 60 ml. of water, keeping the temperature at about 5° C. A smeary brown mass precipitated which was separated from the aqueous layer by decantation.

A small sample of the precipitate was triturated with alcohol, whereupon it became crystalline. Two recrystallizations from ethanol gave 4-methoxy-2-nitrophenylhydrazide of the α-oxalate of L-threonic acid lactone; orange needles melting at 75° C.

The bulk of the smeary brown mass referred to above was ground in a mortar with 100 ml. of 5 N sodium hydroxide and 200 ml. of ethanol. The gelatinous deep blue precipitate was filtered and washed with aqueous alcohol. It was then dissolved in 250 ml. of hot water. The filtered solution was acidified with 50 ml. of 5 N hydrochloric acid to precipitate the free oxalic acid mono 4-methoxy-2-nitrophenylhydrazide in yellow needles. The material was washed with water and was twice recrystallized from 95 per cent ethanol. M. P. 180–181° C.

Example 2

A sample of 0.5215 g. of oxalic acid mono 4-methoxy-2-nitrophenylhydrazide was dissolved in 40 ml. of 0.1 N sodium hydroxide. Then 150 ml. of ethanol was added. The deep blue crystalline precipitate was filtered and washed with ethanol. It was the disodium salt of oxalic acid mono 4-methoxy-2-nitrophenylhydrazide. This product was found to be active in combatting viral infections of the influenza A type.

Example 3

A suspension of 5.04 g. (0.03 mol) of 4-methoxy-2-nitroaniline in a mixture of 7.2 ml. of concentrated hydrochloric acid and 3 ml. of water was digested a few minutes on a water bath. After addition of 5 ml. of water and cooling to 0° to 5° C. a solution of 2.1 g. of sodium nitrite in 6 ml. of water was added dropwise, with continued cooling, until a permanent starch-iodide test was obtained. After filtering, the solution was added to a solution of 5.3 g. (0.03 mol) of D-isoascorbic acid in 18 ml. of water, not permitting the temperature to rise above 5° C. After allowing the resultant mixture to rise to room temperature, the precipitated mass of 4-methoxy-2-nitrophenylhydrazide of D-erythronic acid lactone crystallized. It was filtered, washed with water, dissolved in 90 ml. of warm ethanol and treated with 30 ml. of 5 N sodium hydroxide. The resultant deep blue precipitate of the disodium salt of oxalic acid mono 4-methoxy-2-nitrophenylhydrazide was filtered, washed with ethanol and dissolved in about 350 ml. of hot water. The filtered solution was acidified with 20 ml. of 5 N hydrochloric acid. The crystalline precipitate was filtered and washed with water. M. P. 179–180° C. A mixed melting point with oxalic acid mono 4-methoxy-2-nitrophenylhydrazide produced according to Example 1 gave no depression.

Example 4

A solution of 2.22 g. (0.0176 mol) of oxalic acid dihydrate, 20 ml. of water, and 0.81 g. (0.044 mol) of 4-methoxy-2-nitrophenylhydrazine was heated for one half hour on the steam bath. After cooling and filtering, the yellow precipitate was washed with water, dried, and dissolved in 20 ml. of ethanol. Upon cooling, a by-product precipitated, which was separated by filtration. From the filtrate the desired material was crystallized by the addition of 5 ml. of water. It was filtered and washed with aqueous alcohol. The product, oxalic acid mono 4 - methoxy - 2 - nitrophenylhydrazide, had M. P. 180–181° C. A mixed melting point with the same product produced according to Example 1 showed no depression.

Example 5

A mixture of 9.14 g. of oxalic acid mono 4-methoxy-2-nitrophenylhydrazide and 90 cc. of acetic acid was refluxed for one hour. The acid was evaporated in vacuo and the residue was dissolved in 75 cc. of hot ethanol. The solution upon cooling gave yellow crystals which were filtered and washed with ethanol and ether. The product, formic acid 4-methoxy-2-nitrophenylhydrazide, melted at 164–167° C., and after recrystallization from ethanol at 171–172° C. This compound can also be identified by the alternative nomenclature 1-formyl-2-(2-nitro-4-methoxyphenyl)hydrazine.

Example 6

A mixture of 3.44 g. of oxalic acid mono 4-methoxy-2-nitrophenylhydrazide and 50 cc. of propionic acid was refluxed for 30 minutes. The acid was evaporated in vacuo and the residue was crystallized from 20 cc. of ethanol. It was recrystallized from 50 cc. of ethanol. The product, formic acid 4-methoxy-2-nitrophenylhydrazide, melted at 171–172° C.

Example 7

A mixture of 0.2 g. of 4-methoxy-2-nitrophenylhydrazine and 5 cc. of formic acid (97.5 per cent) was refluxed for 30 minutes. Evaporation on the water bath produced a semicrystalline mass which was dissolved in 5 cc. of ethanol. Upon cooling, crystals were obtained which were filtered and washed with ethanol. The product, formic acid 4-methoxy-2-nitrophenylhydrazide, had M. P. 171–172° C. This product, in the form of its sodium salt, is useful to combat viruses of the influenza A type.

We claim:

1. A compound selected from the class consisting of formic acid 4-methoxy-2-nitrophenylhydrazide and oxalic acid mono 4-methoxy-2-nitrophenylhydrazide and alkali metal salts therof.
2. Formic acid 4-methoxy-2-nitrophenylhydrazide.
3. Oxalic acid mono 4-methoxy-2-nitrophenylhydrazide.
4. 4-methoxy-2-nitrophenylhydrazide of the α-oxalate of α,β,γ-trihydroxybutyric acid lactone.
5. 4-methoxy-2-nitrophenylhydrazide of the α-oxalate of L-threonic acid lactone.
6. A process of making formic acid 4-methoxy-2-nitrophenylhydrazide which comprises heating oxalic acid mono 4-methoxy-2-nitrophenylhydrazide, dissolved in a liquid aliphatic monocarboxylic acid, at a temperature above about 115° C.

References Cited in the file of this patent

FOREIGN PATENTS 51,964    Germany _____ July 26, 1889

OTHER REFERENCES

Michael: J. pr. Chem. [2] 35, 458 (1887).
Erlbach: Berichte 68, 534–539 (1935).
Bischler: Berichte 22, 2801–2804 (1889).
Micheel et al.: Z. physiol. Chem., 216, pp. 233–238 (1933).